United States Patent [19]

Kikuchi et al.

[11] 4,041,134

[45] Aug. 9, 1977

[54] PROCESS FOR REMOVING SULFATE IONS FROM EXTRACTED PHOSPHORIC ACID EMPLOYING BARIUM COMPOUNDS AND ACTIVATED CARBON

[75] Inventors: Mitsuo Kikuchi; Yoichi Hiraga, both of Shin-nanyo, Japan

[73] Assignee: Toyo Soda Manufacturing Co., Ltd, Japan

[21] Appl. No.: 695,309

[22] Filed: June 11, 1976

[30] Foreign Application Priority Data

Feb. 13, 1976 Japan .................................. 51-13943

[51] Int. Cl.$^2$ .......................................... C01B 25/16
[52] U.S. Cl. ............................................... 423/321 S
[58] Field of Search ................ 423/321 R, 321 S, 335; 210/38 R

[56] References Cited

U.S. PATENT DOCUMENTS

| 2,285,242 | 6/1942 | Weber et al. ......................... 423/554 |
| 2,929,777 | 3/1960 | Clevenger et al. ............... 423/321 R |
| 3,366,448 | 1/1968 | Martin et al. ..................... 423/321 S |
| 3,367,738 | 2/1968 | Schallert et al. ................. 423/321 S |
| 3,554,694 | 1/1971 | Barker et al. ......................... 423/321 |
| 3,784,678 | 1/1974 | Beltz et al. ......................... 423/321 S |
| 3,949,047 | 4/1976 | Cherndon et al. ............... 423/321 R |

FOREIGN PATENT DOCUMENTS 43-21173  9/1968  Japan ............................... 423/321 R

OTHER PUBLICATIONS

Baker Catalog – No. 620 – 1961 – p. 167.

Primary Examiner—O. R. Vertiz
Assistant Examiner—Eugene T. Wheelock
Attorney, Agent, or Firm—Oblon, Fisher, Spivak, McClelland & Maier

[57] ABSTRACT

A process for removing sulfate ions from extracted phosphoric acid which is substantially free of metallic ion contaminants, which comprises adding less than the stoichiometric equivalent of a barium compound relative to the amount of dissolved sulfate ion to said extracted phosphoric acid to form barium sulfate crystals, adding active carbon to the resulting slurry, separating the solid components from the slurry and recovering purified phosphoric acid.

6 Claims, No Drawings

PROCESS FOR REMOVING SULFATE IONS FROM EXTRACTED PHOSPHORIC ACID EMPLOYING BARIUM COMPOUNDS AND ACTIVATED CARBON

BACKGROUND OF THE INVENTION

1. Field of the Invention

The present invention relates to a process for removing sulfate ions from extracted phosphoric acid.

2. Description of the Prior Art

In the past, it has been known that wet process phosphoric acid which is produced by sulfuric acid decomposition of phosphate rock, can be extracted by an organic solvent which dissolves phosphoric acid and has low solubility to water. Such solvents include various alcohols, ketones, ethers, phosphoric acid esters, amines, and the like. After this treatment, the phosphoric acid is extracted by water from the extracted solution of phosphoric acid (hereinafter referred to as the "extraction method"). In this specification, phosphoric acid prepared by purifying the crude phosphoric acid from the wet process (including a pretreated acid) by the extraction method (including a concentration step) will be referred to as the "extracted phosphoric acid".

The phosphoric acid produced by the wet process contains various metallic ion impurities derived from a phosphate rock and sulfate ions derived from sulfuric acid. Using the extraction method, the metallic ion impurities can be effectively removed. However, the sulfate ions are not satisfactorily removed and a large amount of sulfate ions still remain in the extracted phosphoric acid. The phosphoric acid used in industrial products, medicines and foods must be a pure phosphoric acid having substantially no sulfate ions, such as one having less than 30 wt. ppm as $SO_4$ as in the Japanese Industrial Standard. In order to decrease sulfate ions sufficiently for use of the phosphoric acid in the industrial applications, it is necessary to remove sulfate ions from the wet process phosphoric acid or from the extracted phosphoric acid. It has been known to remove sulfate ions as calcium sulfate from a wet process phosphoric acid by adding a calcium compound such as phosphate rock, calcium hydroxide or calcium carbonate. However, calcium sulfate has a relatively high solubility. Accordingly, even though a large excess of the calcium compound is used, sulfate ions remain present in a concentration in the range of 1000–2000 wt. ppm as $SO_4$. It is difficult to lower the concentration of the sulfate ions.

Even when the desulfated wet process phosphoric acid is further purified by extraction, sulfate ions in a concentration of at least 500 wt. ppm as $SO_4$ remain in the extracted phosphoric acid. It has also been known to remove sulfate ions as barium sulfate and thereby lower the concentration by using a barium compound. However, it is not preferred to use that method on the wet process phosphoric acid because of the following reasons.

a. The sulfate ion content is higher than that of the extracted phosphoric acid whereby the consumption of the expensive barium compound is high.

b. Hydrofluorosilicic acid is generally present whereby the barium compound is consumed for the formation of crystals of barium fluorosilicate.

c. The concentrations of the sulfate ion and hydrofluorosilicic acid fluctuates depending upon the fluctuations in the composition of the phosphate rock and the operating conditions are critical whereby the phosphoric acid may be contaminated by barium ions because of an inadvertant excess addition of the barium compound.

d. Hydrofluoric acid is also present. Accordingly, the selection of a suitable material for the filter used for separating the barium sulfate is restricted. Moreover, it is difficult to use stainless steel.

e. The crystals of barium sulfate are fine and smaller than those of the extracted phosphoric acid. This may be caused by the presence of organic materials and metallic impurities.

Moreover, the viscosity of the slurry is high even though the concentration of phosphoric acid is low. Accordingly, the separation of barium sulfate is difficult.

SUMMARY OF THE INVENTION

Accordingly, it is an object of the present invention to provide a process for removing sulfate ions from extracted phosphoric acid wherein the operation for precipitating the sulfate ions is easy and stable and the reaction time and the aging time are shortened so that continuous operation of the series of steps is feasible with a simplification and miniaturization of the apparatus required.

It is another object of the present invention to provide a process for substantially removing sulfate ions from extracted phosphoric acid to the degree required for the use of the phosphoric acid in industrial products, medicines and foods, without the formation of super-fine crystals and without formation of turbidity during storage or in the various uses, whereby a shorter aging time is required for prevention of turbidity after the filtering operation in a continuous system.

These and other objects of this invention as will hereinafter become clear have been attained by providing a process for substantially removing sulfate ions from extracted phosphoric acid which comprises adding a barium compound to the extracted phosphoric acid, then adding active carbon to the resulting slurry and separating the solid components from the slurry.

DETAILED DESCRIPTION OF THE PREFERRED EMBODIMENTS

The inventors have made several studies of processes for substantially removing sulfate ions from extracted phosphoric acid as barium sulfate. As a result, it has been found that super-fine crystals of barium sulfate which are very much smaller than the size of fine crystals are formed by the reaction of sulfate ions with barium ions. Moreover, turbidity is formed by long storage after the separation of the barium sulfate, or in the preparation of condensed phosphoric acids. It has also been found that these phenomena do not occur when no barium compound treatment is used. Accordingly, it is clear that the turbidity phenomenon is caused by the barium compound treatment. It has been determined that the phenomena are caused by the dissolved barium ions in the phosphoric acid.

It is known that barium sulfate is an insoluble salt. Its solubility product in water is in the range of $8.7 \times 10^{-11}$ to $2.8 \times 10^{-10}$, quite insoluble. However, according to measurements, the solubility product of barium sulfate in pure phosphoric acid varies in the range of from $1 \times 10^6$ to $2 \times 10^{-9}$ depending upon the concentration of its phosphoric acid and the temperature. It is clear that barium sulfate is still sparingly soluble but is relatively more soluble in phosphoric acid than in water. In accordance with these new findings, the present inventors have determined that the formation of superfine crystals and turbidity can be prevented by controlling the amount of the barium compound added so that the amount of remaining dissolved sulfate ions is at least 5 wt. ppm as $SO_4$ in the extracted phosphoric acid. However, the extracted phosphoric acid contains dissolved sulfate ions in the range of 500-5000 wt. ppm as $SO_4$. Therefore, it is difficult to decrease the $SO_4$ content from 500-5000 wt. ppm to 5-30 wt. ppm by the single step of addition of the barium compound. The problems encountered involve the accuracy of analysis of $SO_4$, the purity of the barium compound, the accuracy of weighing, etc. As a result, there is a high possibility of excess addition of the barium compound.

When a plurality of additions of the barium compound are used each followed by a measurement of the sulfate ion concentration in the phosphoric acid, the concentration of the dissolved sulfate can be adjusted into the proper range in relative safety. However, in this technique, super-saturation of barium sulfate is relatively stable whereby it is necessary to age the slurry for a long time. Accordingly, a large size reactor is required and a batch system must be used. The inventors have also found that it is necessary to age the slurry for a long time before the separation of the solid components in order to prevent turbidity in storage even though clear phosphoric acid can be obtained by separating the solid compounds from the slurry resulting from the addition of the barium compound. The present inventors have discovered the above-mentioned problems which were consequently considered in determining a process for removing sulfate ions from extracted phosphoric acid by addition of a barium compound. As a result, it has been found that when a barium compound is added to extracted phosphoric acid to convert a part of the sulfate ions to barium sulfate and to precipitate them, and thereafter active carbon is added to the slurry to adsorb the dissolved sulfate ions, it is possible to shorten the reaction time and the aging time and to obtain crystals which are easily filtered. Moreover, the phosphoric acid prepared by subsequently separating the solid components suffers from no turbidity after being stored. Accordingly, it is clear that the reaction operation is easy, the series of steps can be operated continuously and the reactor and the filter can be simplified and miniaturized.

In the process of this invention, the barium compound is added to the extracted phosphoric acid. In this step, the amount of barium compound used should be less than the stoichiometric equivalent to the amount of sulfate ions in the extracted phosphoric acid, in order to prevent contamination of barium ions and the subsequent formation of turbidity in the phosphoric acid after the separation of the sold components. In order to lighten the load for the following active carbon treatment, the amount of the barium compound should preferably be in the range of 80-95 mole % relative to the amount of sulfate ions in the phosphoric acid because an excess addition of the barium compound causes difficulties as mentioned above. When such an amount of the barium compound is used, and by the following active carbon treatment, the amount of the dissolved sulfate ion in the phosphoric acid can be decreased to less than 30 wt. ppm. Suitable barium compounds for use in the process of this invention include barium hydroxide, barium carbonate, barium phosphate, barium sulfide, barium nitrate, barium chloride and the like. When contamination by the anion must be prevented, it is preferred to use barium hydroxide, barium carbonate or barium phosphate. When barium sulfide is used, most of the excess sulfide is removed from the system as hydrogen sulfide and the dissolved hydrogen sulfide can be easily removed by injection of air and the like. Thus, contamination can be prevented.

As described below, active carbon is added after the addition of the barium compound. After the solid components are separated from the resulting slurry, they can be calcined to obtain a calcined product containing a main component of barium sulfide. This calcined product can be used as the barium compound in this invention whereby the cost of the expensive barium compound can be decreased. These barium compounds can be used in any form such as solids, aqueous solutions, phosphoric acid solutions and the like. The treatment time in the barium compound step is not critical. For example, in a continuous process, it is sufficient to provide a suitable residence time for contacting a phosphoric acid with the barium compound. In a batch process, it is possible to conduct the subsequent step after completing the addition of the barium compound without aging.

Thereafter, the active carbon is added to the slurry prepared by treatment with the barium compound. The amount of the active carbon used is dependent upon the concentration of the dissolved sulfate ions and the temperature, and especially upon the concentration of phosphoric acid. When the latter is higher than 70 wt. % as $H_3PO_4$, the amount of active carbon can be small and is usually in the range of 0.05 – 5 wt. % relative to the amount of $P_2O_5$ in the extracted phosphoric acid. The concentration of sulfate ion can be less than 30 wt. ppm in such a phosphoric acid (higher than 70 wt. % of $H_3PO_4$) prepared by removing 80-95% of the sulfate ions by the precipitation with the barium compound from extracted phosphoric acid ($H_3PO_4$:20-40 wt. % as non-concentrated extracted phosphoric acid; $SO_4$ 500-5000 wt. ppm). When the treatment of active carbon is conducted after the precipitation of the sulfate ions as barium sulfate, the sulfate ions can be removed to only a trace lever. On the contrary, when the active carbon only is added to the extracted phosphoric acid to remove the sulfate ions, the adsorption is quite small so that it is uneconomincal.

It has moreover been found that the aging time required for the barium sulfate can be greatly shortened by the treatment with active carbon. At least one day has usually been required for aging of barium sulfate crystals. Otherwise, even though the solid components are filtered to obtain a clear solution, turbidity is caused in storage. However, when treated with active carbon, the aging time can be shortened to only several hours. The reason is not completely clear, but it is theorized that the barium ions and sulfate ions are absorbed in some special form on the active carbon by a synergistic effect. When the barium compound is added to the extracted phosphoric acid and then the active carbon added, the following process is theorized.

1. The dissolved barium ions are adsorbed on the active carbon.
2. The aging time is shortened by the adsorption of the barium ions.
3. The sulfate ions are further adsorbed on the active carbon to a high degree by the adsorption of barium ions.

The concentration of phosphoric acid used in the process of this invention, the temperature for the treatment of the barium compound and the treatment of active carbon, are not critical. In order to decrease the amount of active carbon used and to remove the sulfate ions to a high degree, it is preferred that the concentration of the phosphoric acid as $H_3PO_4$ be higher than 70 wt. % and temperature of the treatment be 30–80° C.

After the active carbon treatment, the solid components are separated from the slurry to obtain a pure phosphoric acid from which sulfate ions are removed. The solid components have excellent filtering properties. The solid components contain main components of barium sulfate and active carbon. It has been found that a calcined product containing a main component of barium sulfide can be obtained by calcining the solid components. This calcined product can be used as the barium compound for removing the sulfate ions from the extracted phosphoric acid. The calcination should be conducted in an inert gas, especially in nitrogen gas, in order to prevent the combustion of active carbon. The temperature for calcination should be in the range of 800–1200° C so as to form barium sulfide by reduction of barium sulfate with active carbon. The process of this invention can be conducted in an economical manner by reusing the calcined product as a part or all of the barium compound used in the treatment of this invention.

As is clear from the description above, in accordance with the process of this invention, the required conditions of control of operation are not complicated; the aging time for the slurry can be greatly shortened; the crystals have excellent filtering properties superior to those of the solid components formed only by treatment with a barium compound; the reactor and the filter used can be simplified and miniaturized; all steps can be conducted in a continuous process; super-fine crystals are not formed; and turbidity of the resulting phosphoric acid does not occur after the separation of the solid components during storage or various other treatments. Moreover, the calcined product prepared by calcining the residual solid components separated from the slurry, can be used as the barium compound, whereby the amount of the barium compound consumed can be decreased to attain an advantageous process.

Having generally described the invention, a more complete understanding can be obtained by reference to certain specific examples, which are provided herein for purposes of illustration only and are not intended to be limiting unless otherwise specified.

The terms "%" and "ppm" are respectively "% by weight" and "ppm by weight". The transmittance was measured by using water as a blank. In the filtering operation, a G-2 glass filter which was precoated with a filtering auxiliary agent Fine-flow (manufactured by Showa Kagaku Kogyo K. K.) in a thickness of 3 mm was used under a pressure difference of 0.92 kg/cm².

EXAMPLE 1

A calcined phosphate rock (Morocco) was treated with sulfuric acid to obtain a crude wet process phosphoric acid ($H_3PO_4$-47.6%; $SO_4$-0.92%). The crude wet process phosphoric acid was contacted with n-butanol in a multi-stage counter-current extraction. The extracted solution of phosphoric acid was back-extracted with water to obtain an extracted phosphoric acid solution ($H_3PO_4$-33.0%; $SO_4$-0.320%). The extracted phosphoric acid solution was concentrated under a reduced pressure to obtain an extracted phosphoric acid ($H_3PO_4$-92.6%; $SO_4$-0.888%). A barium salt-phosphoric acid mixture ($H_3PO_4$-50%; Ba-6.00%) was prepared by dissolving barium carbonate in pure phosphoric acid. A 205.0 g sample of the barium salt-phosphoric acid mixture was added to 1000 g of the extracted phosphoric acid at 80° C with stirring during about 1 hour. The mixture was kept at 80° C for 6 hours to age it thereby obtaining a slurry having 216 ppm of the dissolved sulfate as $SO_4$. The slurry was gradually cooled to 60° C and 15.0 g of powdery active carbon was added. The mixture was stirred for 3 hours and filtered. The filtering speed was 1.01 m³/m² hr. and the filtrate was a clear solution. ($H_3PO_4$-86.9%; $SO_4$-25.3 ppm; transmittance-101%). The residue was used in Example 2. When the filtrate was stored for 1 month, no change was found.

REFERENCE EXAMPLE 1

The slurry (216 ppm of dissolved $SO_4$) of Example 1 was admixed with 4.80 g of the barium salt-phosphoric acid mixture of Example 1 at 80° C. The mixture was gradually cooled and kept at 60° C for 3 hours for aging and was filtered. The filtering speed was 0.43 m³/m² hr. and the filtrate was a clear solution ($SO_4$-17.2 ppm; transmittance-101%). When the filtrate was stored for 1 month, the transmittance was decreased to 91%.

REFERENCE EXAMPLE 2

A 15 g sample of powdery active carbon was added to 1000 g of the extracted phosphoric acid of Example 1. The mixture was stirred at 60° C for 3 hours and was filtered. The concentration of $SO_4$ was not changed.

EXAMPLE 2

This residue of Example 1 was washed with water to obtain 50.3 g of the composition:
$BaSO_4$-40.8%; C-28.4%; Water, etc.-30.8%.
The composition was calcined at 1000° for about 3 hours to obtain 15.5 g of black product (Ba:77%). The crushed black product and 10.0 g of barium carbonate were dissolved in pure phosphoric acid to obtain 315 g of barium salt-phosphoric acid mixture ($H_3PO_4$:50%; Ba:6.00%). A 205.0 g sample of the barium salt-phosphoric acid mixture was added to 1000 g of the extracted phosphoric acid of Example 1 to treat it under the same conditions. The product was treated with the powdery active carbon to obtain substantially the same results of Example 1.

Having now fully described the invention, it will be apparent to one of ordinary skill in the art that many changes and modifications can be made thereto without departing from the spirit or scope of the invention as set forth herein.

What is desired as new and intended to be secured by letters patent is:

1. A process for removing sulfate ions from extracted phosphoric acid which is substantially free of metallic ion contaminants, which comprises adding less than the stoichiometric equivalent of a barium compound relative to the amount of dissolved sulfate ion to said extracted phosphoric acid to form barium sulfate crystals, adding active carbon to the resulting slurry, separating the solid components from the slurry and recovering purified phosphoric acid.

2. The process of claim 1, wherein the solid components separated are calcined to form a calcined product having a main component of barium sulfide and the calcined product is recycled as the barium compound in the first step of the process.

3. The process of claim 2, wherein the calcined product is prepared by calcining the solid components at 800°-1200° C in a nitrogen atmosphere.

4. The process of claim 1, wherein the amount of barium compound is 80-95 mole% relative to the amount of sulfate ions.

5. The process of claim 1, wherein the phosphoric acid has a concentration greater than 70 wt.% as $H_3PO_4$ and the amount of active carbon is 0.05-5 wt.% relative to the amount of $P_2O_5$ in the extracted acid.

6. The process of claim 5, wherein the treatment temperature is 30°-80° C.

* * * * *